(12) United States Patent
Mathur et al.

(10) Patent No.: US 8,117,273 B1
(45) Date of Patent: Feb. 14, 2012

(54) SYSTEM, DEVICE AND METHOD FOR DYNAMICALLY SECURING INSTANT MESSAGES

(75) Inventors: Saroop Mathur, Los Altos, CA (US); Rajamadam C. Venkatraman, San Jose, CA (US); Charlie Kim, Santa Clara, CA (US); Ashish Warty, San Jose, CA (US); Yih-Ming M. Liao, Saratoga, CA (US)

(73) Assignee: McAfee, Inc., Santa Clara, CA (US)

( * ) Notice: Subject to any disclaimer, the term of this patent is extended or adjusted under 35 U.S.C. 154(b) by 1032 days.

(21) Appl. No.: 10/890,394

(22) Filed: Jul. 12, 2004

Related U.S. Application Data

(60) Provisional application No. 60/486,873, filed on Jul. 11, 2003.

(51) Int. Cl.
*G06F 15/16* (2006.01)

(52) U.S. Cl. ........ 709/207; 709/206; 713/150; 713/153; 713/168; 713/171; 713/175

(58) Field of Classification Search .................. 709/207, 709/206; 713/150, 153, 168, 171, 175
See application file for complete search history.

(56) References Cited

U.S. PATENT DOCUMENTS

| | | | | |
|---|---|---|---|---|
| 4,941,176 A * | 7/1990 | Matyas et al. | ................ | 380/280 |
| 5,384,848 A * | 1/1995 | Kikuchi | ........................ | 713/155 |
| 6,052,784 A * | 4/2000 | Day | ................ | 726/22 |
| 6,185,680 B1 * | 2/2001 | Shimbo et al. | ................ | 713/160 |
| 6,742,116 B1 * | 5/2004 | Matsui et al. | ................ | 713/171 |
| 7,093,129 B1 * | 8/2006 | Gavagni et al. | ................ | 713/175 |
| 7,131,003 B2 * | 10/2006 | Lord et al. | .................... | 713/168 |
| 2002/0023143 A1 * | 2/2002 | Stephenson et al. | .......... | 709/218 |
| 2002/0169954 A1 * | 11/2002 | Bandini et al. | ................ | 713/153 |
| 2003/0160096 A1 * | 8/2003 | Morimoto | .................... | 235/375 |
| 2003/0172122 A1 * | 9/2003 | Little et al. | .................... | 709/207 |
| 2003/0204741 A1 * | 10/2003 | Schoen et al. | ................ | 713/200 |
| 2004/0165727 A1 * | 8/2004 | Moreh et al. | ................ | 380/278 |

* cited by examiner

*Primary Examiner* — Yves Dalencourt
*Assistant Examiner* — Michael C Lai
(74) *Attorney, Agent, or Firm* — Fish & Richardson P.C.

(57) ABSTRACT

An Instant Messaging security system that encrypts Instant Messages sent by a Instant Messaging user to an Instant Messaging server by intercepting the messages, negotiating a preferred security algorithm and forwarding the encrypted messages to the server. The security system intercepts and decrypts encrypted messages sent by the server to the user. The security system is able to determine whether a receiving user is equipped with a similar security system without prior knowledge of network addresses, configuration or capability. The security system is transparent to the Instant Message service provider and may provide one or more indicators to users that messages are encrypted during forwarding.

15 Claims, 6 Drawing Sheets

| Packet Identifier ||||
|---|---|---|---|
| Type (01) | Subtype (01) | Length ||
| NONCE Len | Proposed Security | Alternate-1 Security | Alternate-2 Security |
| CERT Len || CERT² Len ||
| CERT³ Len || CERT⁴ Len ||
| Key Type | Auth Type | 00 | 00 |
| 00 ||| 00 |
| NONCE ||||
| CERT [CERT² [CERT³ [CERT⁴]]] ||||

Figure 4

| Packet Identifier ||||
|---|---|---|---|
| Type (01) | Subtype (02) | Length ||
| NONCE Len | Security | 00 | 00 |
| CERT Len || CERT² Len ||
| CERT³ Len || CERT⁴ Len ||
| Key Type | Auth Type | P-NONCE Len | KEYID Len |
| KEY Len || AUTH Len ||
| NONCE ||||
| CERT [CERT² [CERT³ [CERT⁴]]] ||||
| P-NONCE ||||
| KEYID ||||
| KEY ||||
| AUTH ||||

Figure 5

| Packet Identifier ||||
|---|---|---|---|
| Type (01) | Subtype (03) | Length ||
| 00 | Preferred Security | 00 | 00 |
| 00 || 00 ||
| 00 || 00 ||
| Key Type | Auth Type | P-NONCE Len | KEYID Len |
| KEY Len || AUTH Len ||
| P-NONCE ||||
| KEYID ||||
| KEY ||||
| AUTH ||||

Figure 6

| Packet Identifier |||
|---|---|---|
| Type (01) | Subtype (04) | Length |
| KEYID$_s$ |||

Figure 7

| Packet Identifier | | |
|---|---|---|
| Type (01) | Subtype (05) | Length |
| KEYID$_s$ | | |

Figure 8

| Packet Identifier | | |
|---|---|---|
| Type (01) | Subtype (ff) | Length (04) |
| Error Group | Error Level | Error Code |

Figure 9

SYSTEM, DEVICE AND METHOD FOR DYNAMICALLY SECURING INSTANT MESSAGES

CROSS-REFERENCE TO RELATED APPLICATIONS

This utility application is related to and claims the benefit of priority to U.S. Provisional Application No. 60/486,873, filed Jul. 11, 2003, which is fully incorporated herein by reference for all purposes.

BACKGROUND OF THE INVENTION

1. Field of the Invention

Generally, the present invention relates to Internet Communications. More specifically, the present invention relates to Instant Messaging systems and secured communications for Instant Messaging systems.

2. Description of the Related Art

Instant Messaging ("IM") services provide communications between computer users connected to the Internet. Typically an IM service provider, such as AOL receives a message from a first user and forwards the message to a second user. The first user need not be aware of the location or network address of the second user. Similarly, the second user can respond with a message to the first user, having no knowledge of the location of the first user. The user data contained in the IM messages is encoded within a protocol proprietary to the service provider.

IM services are generally Internet-based services and IM messages pass through the Internet, even if the first and second users are physically located within the same building of corporation. Although the users could be sitting next to each other, IM traffic is nevertheless transmitted from the first user over the Internet to the service provider and thence relayed to the second user. Therefore, the security of IM messages depends on the minimal security provided by the Internet.

Therefore, what is needed is a system for securing IM traffic as it passes through the Internet.

SUMMARY OF THE INVENTION

The present invention addresses weaknesses in IM security by providing an IM security system for managing and securing Instant Messaging in an enterprise network. Embodiments of the invention include server software that is deployed near the perimeter of the enterprise network. The server software may also be deployed at a service provider if the connection between the enterprise network and the service provider is secure. The server software monitors and intercepts outbound IM traffic and may secure the content of the IM outbound traffic by, for example, encrypting the IM content. The server software also monitors and intercepts inbound IM traffic and may reverse any security process performed on the content by, for example, decrypting the IM content.

The present invention operates independently of IM servers and clients and requires no modifications to either the IM client or the IM server. The IM security system selectively modifies IM content in real-time on a communication channel without the knowledge or consent of the service provider or the transmitting and receiving parties. The ability to selectively modify only the user content without modifying the communications protocol control data ensures that the actions of the IM security system are transparent to the service provider.

The IM security system secures IM content after determining whether the destination network is capable of receiving secured IM messages. For example, where two users are collocated on an enterprise network protected by an IM security device, an IM message sent by one user to the second user passes through the IM security device located near the perimeter of the enterprise network. When the IM message is forwarded to an IM service provider and thence forwarded to the second user, it will necessarily pass through the same IM security device. Hence, in the example, the IM content can be secured by the IM security system because both users are protected by an IM security device. IM messages can also be secured in examples where the IM message exits and reenters the enterprise network through different IM security devices or where the IM message originates and terminates on different enterprise networks and the different enterprise networks are each protected by an IM security device.

Embodiments of the present invention may discover peer IM entities without prior knowledge of network addresses or location of the peer entities. The peer IM entities may be discovered using a discovery protocol that causes a discovery message to be sent to a receiving IM end-user. When the receiving end-user is connected to a network protected by an IM peer security device, the message may be intercepted by the receiving peer security device and the receiving peer security device responds to the sending peer IM entity indicating that a secured connection is possible. If the end-user is unprotected, the discovery message may be displayed by the IM end-user software. In some embodiments however, the discovery message is sent using one or more covert communication channels that cause the IM end-user software to ignore the discovery message.

Embodiments of the present invention may secure communications between IM users without knowing the physical location or network addresses of the IM users. The IM peer entities may use IM messages to exchange security set up information between the IM peer entities. The security set up information may include encryption keys.

The present invention includes methods to direct all IM traffic in a network to pass through an embodiment of the invention. In some embodiments, the IM traffic may be directed to an IM security server by modifying the Domain Name Server (DNS) entry for all IM traffic to the address of the IM security server. IM traffic may also be redirected by providing the IM end-user software with the IM security server's IP address to serve as the address of the end-user's IM service provider.

Embodiments of the invention may also redirect IM traffic using networking equipment such as routers bridges and switches. IM traffic directed toward an IM service provider may be diverted to an IM security server and thence to the IM service provider. By way of example, an IM security server may be inserted directly between the Internet and the enterprise network such that all traffic from the enterprise network must pass through the IM security software.

Embodiments of the invention may provide IM users with visible notification indicating that IM messages are either secured or not secured. This aspect of the invention permits end-users to determine the type and sensitivity of information that can be communicated during an IM "conversation." This aspect of the invention requires no modification to IM client or IM server protocols. In some embodiments the visible notification of security is made by a combination of indicators including appending visible characters to IM content, changing IM text color, modifying buddy icons and adding tags to buddy names.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIGS. 4-9 are diagrams of the contents of communications packets exchanged in the exemplary embodiment of the invention.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the components referred to herein by way of illustration.

Figure 1:
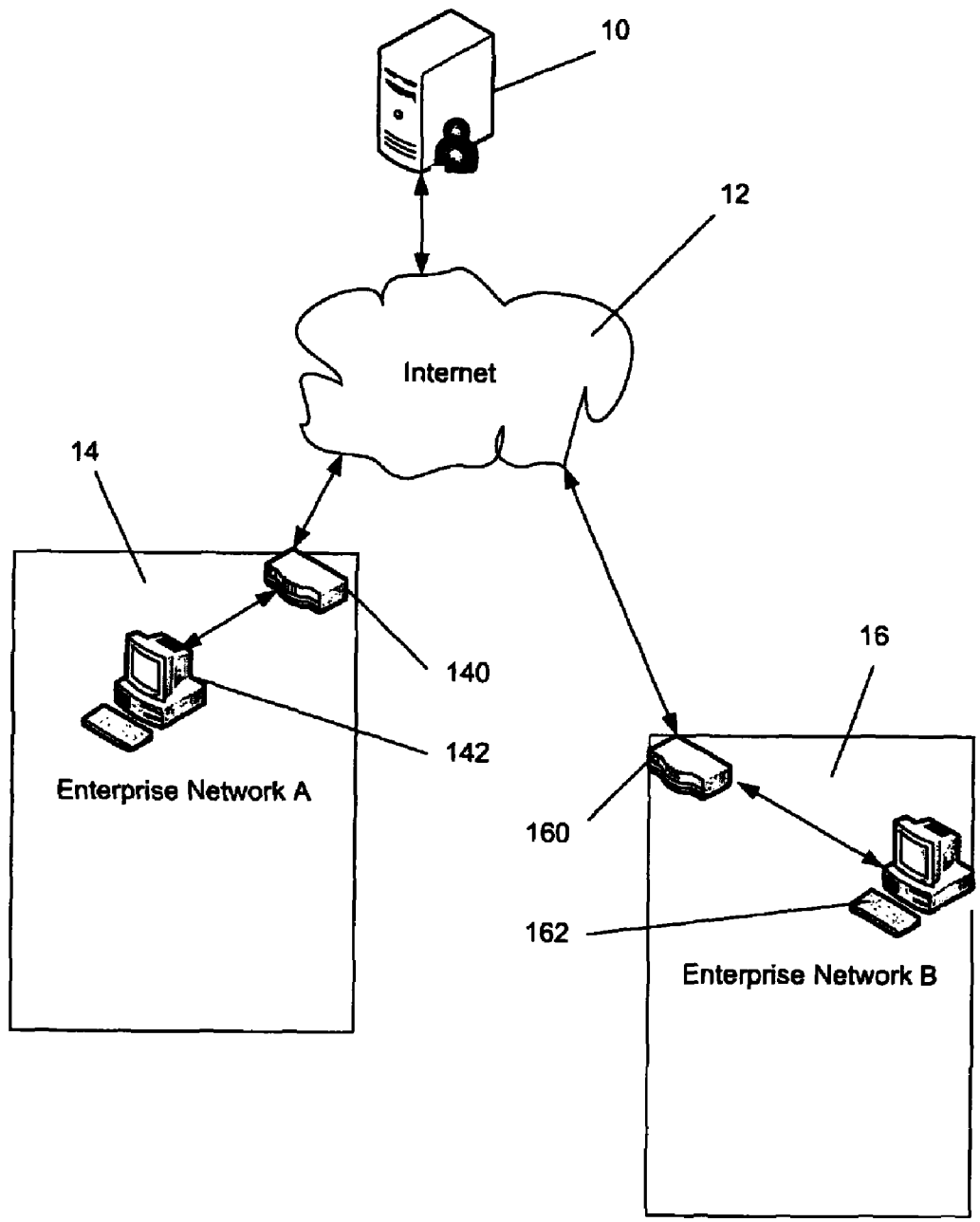
FIG. 1 illustrates a network configured to incorporate an exemplary embodiment of the invention.

The exemplary network shown in FIG. 1 illustrates the operation of an embodiment of the invention. A first computer 142 is connected through a first enterprise network 14 and a first IM security device 140 to the Internet 12. A second computer 162 is connected through a second enterprise network 16 and a second IM security device 160 to the Internet 12. An IM service provider 10 is also connected to the Internet 12. In the example, a first user may send a first IM message from the first computer 142 for delivery to a second user who is logged in at the second computer 162. The first IM message may be intercepted by the first IM security device 140 which discovers that the destination computer 162 is protected by the second IM security device 160. The first IM security device 140 may then exchange security information with the second IM security device 160, where the security information may include identity information, a random unique value (hereinafter "NONCE"), key identifier, key data and authentication information.

Having exchanged security information with the second IM security device 160, the first IM security device 140 may encrypt the content of the first IM message and then transmit the encrypted first message to the IM service provider 10. The IM service provider 10 forwards the first IM message through the Internet 12 to the second enterprise network 16 where it is intercepted by the second IM security device 160. The second IM security device 160 decrypts the content of the first IM message and sends the message onward to the second user at the second computer 162. Thereafter, other messages may be exchanged by the users in this manner. In some embodiments, the exchanged security information may be used to encrypt and decrypt subsequent IM messages transmitted between the first and second computers.

Figure 2:
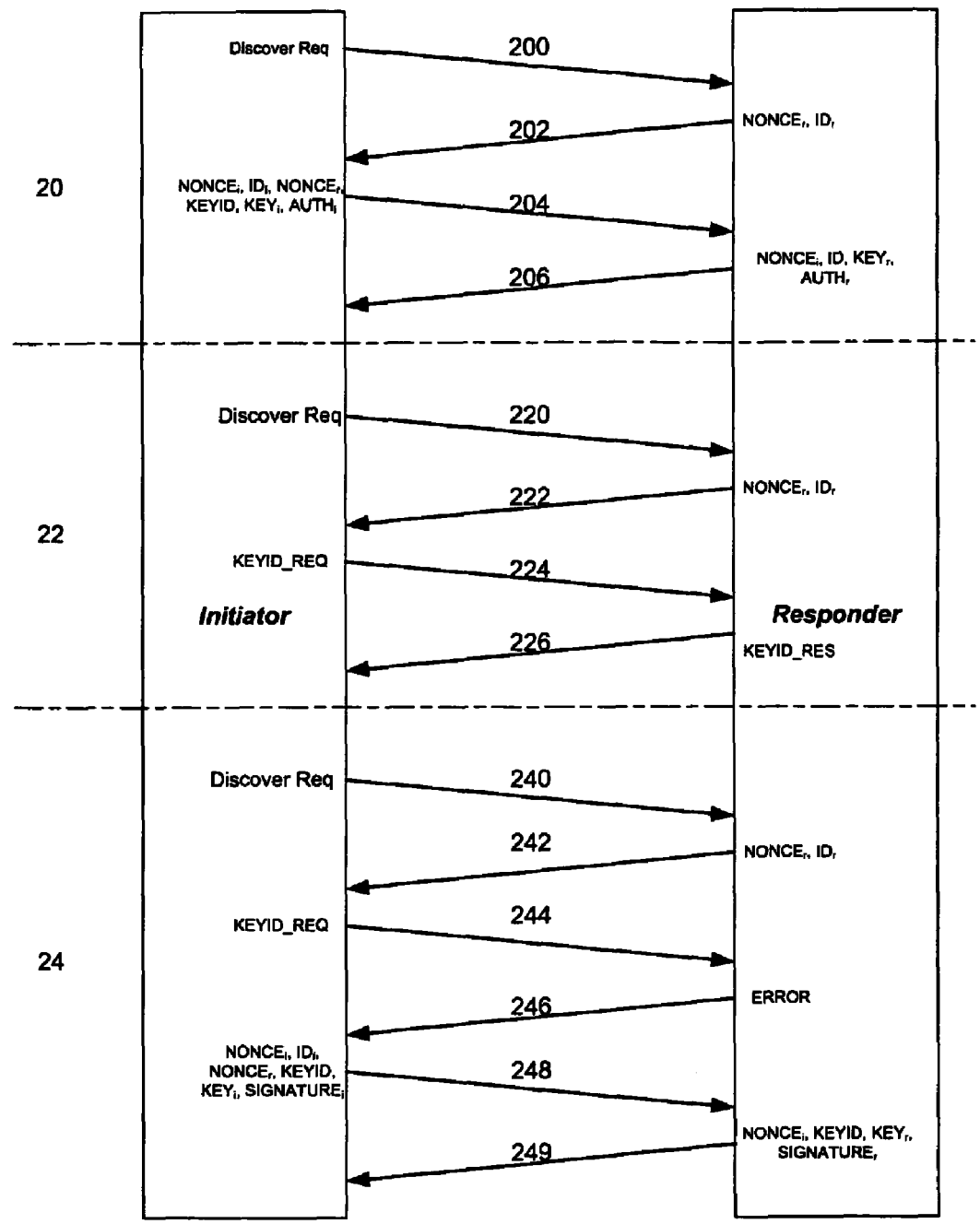
FIG. 2 is a chart showing the protocols associated with the exemplary embodiment of the invention.

Considering now FIG. 2 together with FIG. 1, the protocols used to negotiate security between the IM security devices according to the present invention may be understood. Before security can be added to IM messages, the security devices may execute a discovery protocol 20 to identify the existence and capabilities of other IM security devices visible on the Internet 12. The first IM security device 140, hereinafter the "Initiator," sends a discovery message 200 to indicate the key management capabilities of the Initiator 140. The discovery message 200 indicates to the second security device 160, hereinafter the "Responder," that the Initiator 140 is capable of the Instera Key Management protocol. The Responder 160 sends the Initiator 140 a response 202 that includes the Responder's 160 identifying information ("$ID_r$") and a random unique value ("$NONCE_r$")." The Initiator 140 then transmits a response 204 including a random unique value $NONCE_i$, the initiator's 140 identifying information ("$ID_i$"), a copy of the NONCE, key identifier ("KEYID"), the initiator's 140 key data ("$KEY_i$"), and the initiator's 140 authentication information ("$AUTH_i$"), where the $AUTH_i$ may include an RSA signature. The responder then replies 206 with the $NONCE_i$, the $KEY_i$, and the Responder's 160 authentication information ("$AUTH_r$"), where $AUTH_r$ may include an RSA signature. Thus, in the exemplary embodiment, the Initiator 140 and Responder 160 may establish basic security identification to enable the exchange of one or more secured IM messages.

It will be apparent, to one skilled in the art, that the exchange of identifying information may also include information specifying preferred security algorithms, alternatives (such as AES128). It will also be apparent to those skilled in the art that identifying information includes public key certificates and information necessary to validate and identify the certificate and that the key data may include a Diffie-Hellman public key such as the Diffie-Hellmen Group 2 Key Exchange. Information may be exchanged with base64 encoded data that is line limited to ensure traversal through an IM server.

In some embodiments, the Initiator 140 may request Key information from the Responder 160 to permit the encryption of messages. In the exemplary case, and where both the Initiator 140 and the Responder 160 have a master key, a master key protocol 22 will be followed. The Initiator 140 sends a discovery message 220 to the Responder 160. The Responder 160 sends the Initiator 140 a response 222 containing the Responder's 160 $ID_r$ and $NONCE_r$. The Initiator 140 sends a Key information request ("KEYID_REQ") message 224 to the Responder 160. The Responder 160 sends a response 226 containing Key information necessary to initiate the secured IM message exchange.

In the case that the Initiator 140 has a master key and requests Key information from the Responder 160, but the Responder 160 does not have a master key, then the sequence of packet exchange will be as shown at 24. The Initiator 140 sends a discovery message 240 to the Responder 160. The Responder 160 sends the Initiator 140 a response 242 containing the Responder's 160 $ID_r$ and $NONCE_r$. The Initiator 140 sends a KEYID_REQ message 244 to the Responder 160. The Responder 160 sends the Initiator 140 a response 246 containing an Error message. The Initiator 140 sends a message 248 the $NONCE_i$, the a copy of the $NONCE_r$, the KEYED, the $KEY_i$ and the Initiator's 140 security signature ("$SIGNATURE_i$"). The Responder 160 sends a response message 249 containing the $NONCE_i$, the KEYID, the $KEY_r$, and the Responder's 140 security signature ("$SIGNATURE_r$").

FIGS. 4-9 show the structure and contents of the packets used to negotiate security between the IM security devices. FIG. 4 shows the Identification message 202, 222 and 242. FIG. 5 shows the Identification and Key message 204. FIG. 6 shows the Key data message 206. FIG. 7 shows the KEYID_REQ message 224 and 244. FIG. 8 shows the KEYID_RES message 226. FIG. 9 shows the Key Management Error message 246.

Certain embodiments of the invention may use services provided by a selected Instant Message service provider (such as AOL) that publish IM user capabilities to assist in the identification of end-users and facilitate the exchange of security-related information. In other embodiments, the IM protocol may be adapted to provide capabilities including user identification and security key management.

It will be appreciated by one skilled in the art that private keys associated with, for example, the Diffie-Hellman public key may be used to generate a session key for message encryption and decryption and for digesting verification of the encrypted data.

Figure 3:
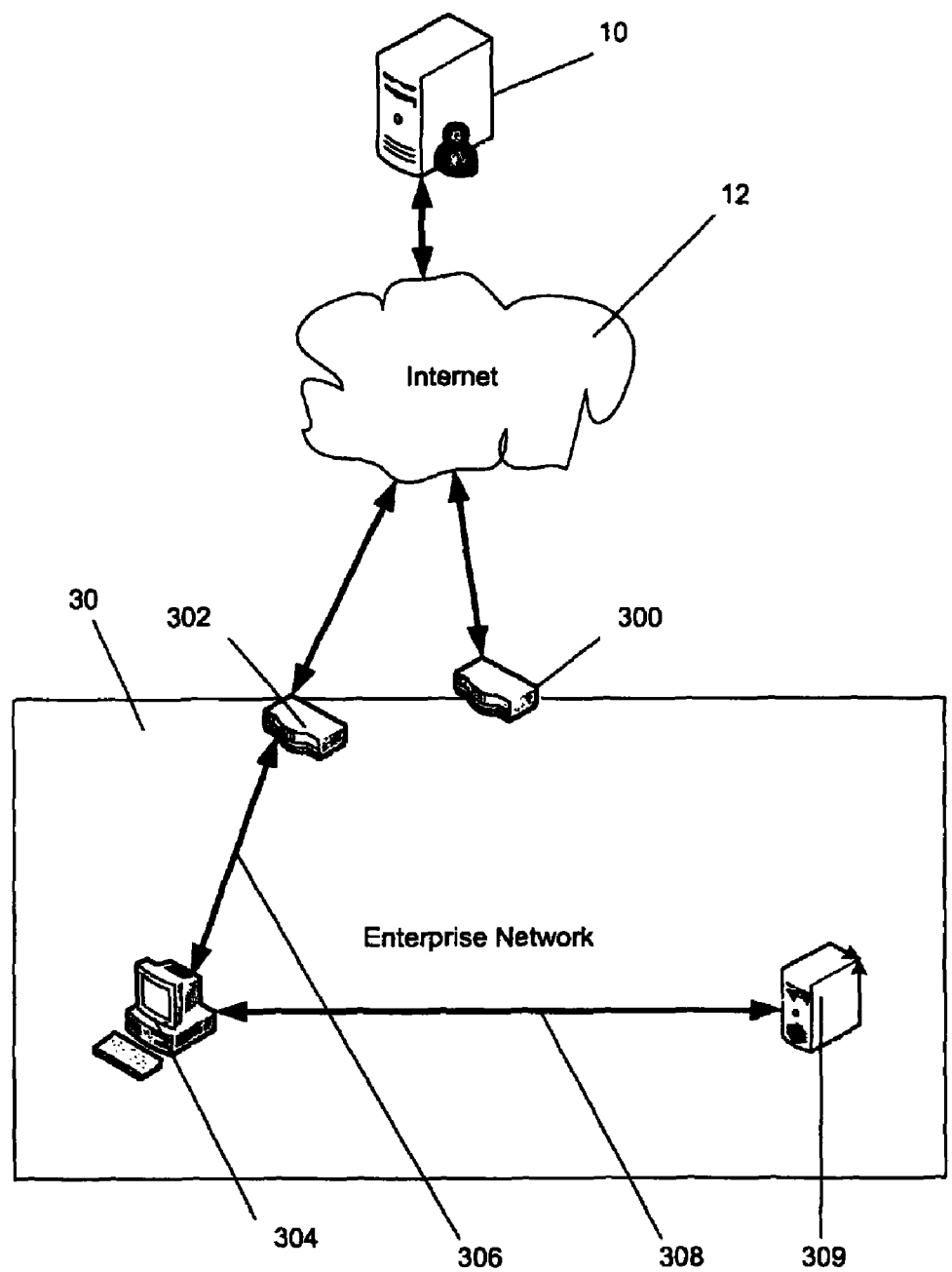
FIG. 3 is a drawing illustrating the method by which IM messages are captured in an exemplary embodiment of the invention.

Referring now to FIG. 3, the method by which embodiments of the present invention control IM messaging from an enterprise network 30 may be understood. Generally, connections to the Internet may be controlled by one or more networking devices 300 including routers and switches. In the exemplary embodiment of the invention, the IM security device 302 may act as a filter for IM messages. IM messages are directed to an address on the Internet 12 corresponding to the IM server 10. The address is known or may be discoverable to a client PC 304 and the client PC 304 directs IM messages to the address. The IM security device captures the messages by capturing enterprise network 30 traffic directed to or from the address of the IM service provider.

Network-attached devices including the client PC 304 may resolve network addresses using one or more DNS servers 309. The one or more DNS servers 309 provide information that permits the client PC 304 to forward IM messages through a network device 300 to the Internet 12. In embodiments of the invention, the one or more DNS servers 309 are adapted to direct all IM traffic to the IM security device 302. The DNS servers may accomplish redirection by providing alternative address information when, for example, the client PC logs in to the IM service. The network device 300 may be programmed to block IM traffic or to redirect IM traffic directly to the IM security device 302.

In some embodiments of the invention IM traffic is captured by blocking IP addresses related to known IM servers 10 and redirecting the traffic to the IM security device 302. To achieve this goal, the one or more network devices 300 are reprogrammed to recognize the IP addresses related to the IM servers 10.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. An instant messaging security device configured for intercepting and encrypting unencrypted instant messages routed for transmission from a first user device to an instant message server through a network and being further configured for intercepting and decrypting encrypted instant messages routed for transmission from the instant message server to the first user device through the network, the instant messaging security device comprising:

a network interface configured to communicate with the first user device and the network to intercept unencrypted instant messages routed for transmission from the first user device to the instant message server through the network, to transmit discovery instant messages, and to intercept encrypted instant messages routed for transmission from the instant message server to the first user device through the network;

a memory storing instructions; and a processing component coupled to the network interface and the memory, the processing component, according to the stored instructions, configured to:

intercept an unencrypted instant message from the first user device addressed to a second user device through an instant message server;

transmit, in response to intercepting the unencrypted instant message, a discovery instant message addressed to the second user device, the discovery instant message including data indicating that the instant messaging security device is capable of encrypting instant message data according to a security protocol;

determine, in response to the discovery instant message, whether a response to the discovery instant message is received from a responding instant messaging security device;

in response to determining a response to the discovery instant message is not received, allow transmission of the unencrypted instant message to the second user device and allow transmission of an unencrypted instant message from the second user device to the first user device;

in response to determining a response to the discovery instant message is received:

transmit a first negotiation instant message to the responding instant messaging security device, the first negotiation instant message including data for negotiating an encryption technique with the responding instant messaging security device to encrypt unencrypted instant messages from the first user device to the second user device and to decrypt encrypted instant messages from the second user device to the first user device;

receive a second negotiation instant message from the responding instant messaging security device, the second negotiation instant message including data specifying the encryption technique;

encrypt the unencrypted instant message from the first user device using the encryption technique;

transmit the encrypted instant message to the second user device;

decrypt encrypted instant messages received from the responding instant messaging security device and addressed to the first user device; and transmit the unencrypted instant message from the second user device to the first user device.

2. The instant messaging security device according to claim 1, wherein the discovery instant message and the response to the discovery instant message include identifying information used to negotiate preferred security algorithms.

3. The instant messaging security device according to claim 1, wherein the first negotiation instant message and the second negotiation instant message include information used to generate encryption keys.

4. The instant messaging security device according to claim 3, wherein the information used to generate encryption keys includes Diffie-Hellman keys.

5. The instant messaging security device according to claim 1, wherein the transmitted unencrypted instant message includes information indicating that the unencrypted instant message has been previously encrypted.

6. The instant messaging security device according to claim 1, wherein encryption capabilities of the instant messaging security device are indicated by the instant messaging security device independent of a third party.

7. The instant messaging security device according to claim 1, wherein the processing component requires no information regarding the presence or location of other instant messaging security devices prior to receiving a response to a discovery instant message to obtain encryption capabilities of a responding instant messaging security device.

8. A method for intercepting and encrypting unencrypted instant messages directed to a receiving user device and routed for transmission from a transmitting user device to an instant message server through a network, the method comprising:
- intercepting an unencrypted instant message from a first user device addressed to a second user device through an instant message server;
- transmitting, in response to intercepting the unencrypted instant message, a discovery instant message including data indicating that an instant messaging security device is capable of encrypting instant message data according to a security protocol;
- determining, in response to the discovery instant message, whether a response to the discovery instant message is received from a responding instant messaging security device;
- in response to determining that a response to the discovery instant message is not received, allowing transmission of the unencrypted instant message to the second user device and allowing transmission of unencrypted instant messages from the second user device to the first user device;
- in response to determining that a response to the discovery instant message is received:
  - transmitting a first negotiation instant message to the responding instant messaging security device, the first negotiation instant message including data for negotiating an encryption technique with the responding instant messaging security device to encrypt unencrypted instant messages from the first user device to the second user device and to decrypt encrypted instant messages from the second user device to the first user device;
  - receiving a second negotiation instant message from the responding instant messaging security device, the second negotiation instant message including data specifying the encryption technique;
  - encrypting the unencrypted instant message from the first user device using the encryption technique; and
  - transmitting the encrypted instant message to the second user device, wherein the encrypted instant message is decrypted by the responding instant messaging security device.

9. The method according to claim 8, further comprising:
- decrypting encrypted instant messages received from the responding instant messaging security device and addressed to the first user device; and
- transmitting the unencrypted instant messages from the responding instant messaging security device to the first user device.

10. The method according to claim 9, wherein the encrypted instant message is capable of being transmitted to the second user device using an instant message server on a network.

11. The method according to claim 8, wherein the step of intercepting the unencrypted instant messages comprises:
- configuring one or more DNS servers to reroute network communications between the first user device and an instant message server such that network communications pass through an instant messaging security device.

12. The method according to claim 8, wherein an instant messaging security device is physically located between an instant message server and the user device such that network communications between the first user device and an instant message server pass through the instant messaging security device.

13. The method according to claim 12, wherein the instant security device is collocated with an instant message server.

14. The method according to claim 12, wherein the instant messaging security device is collocated with the first user device.

15. The method according to claim 8, wherein encryption capabilities associated with the responding instant messaging security device are obtained independent of a third party.

* * * * *

UNITED STATES PATENT AND TRADEMARK OFFICE
CERTIFICATE OF CORRECTION

| | | |
|---|---|---|
| PATENT NO. | : 8,117,273 B1 | |
| APPLICATION NO. | : 10/890394 | |
| DATED | : February 14, 2012 | |
| INVENTOR(S) | : Saroop Mathur | |

It is certified that error appears in the above-identified patent and that said Letters Patent is hereby corrected as shown below:

In Claim 13, Line 41, Column 8, after "instant" insert --messaging --, therefor.

Signed and Sealed this
Twenty-fourth Day of April, 2012

David J. Kappos
*Director of the United States Patent and Trademark Office*